Nov. 29, 1927.
W. B. CLIFFORD
MATERIAL HANDLING APPARATUS
Filed May 16, 1924
1,651,253
2 Sheets-Sheet 1
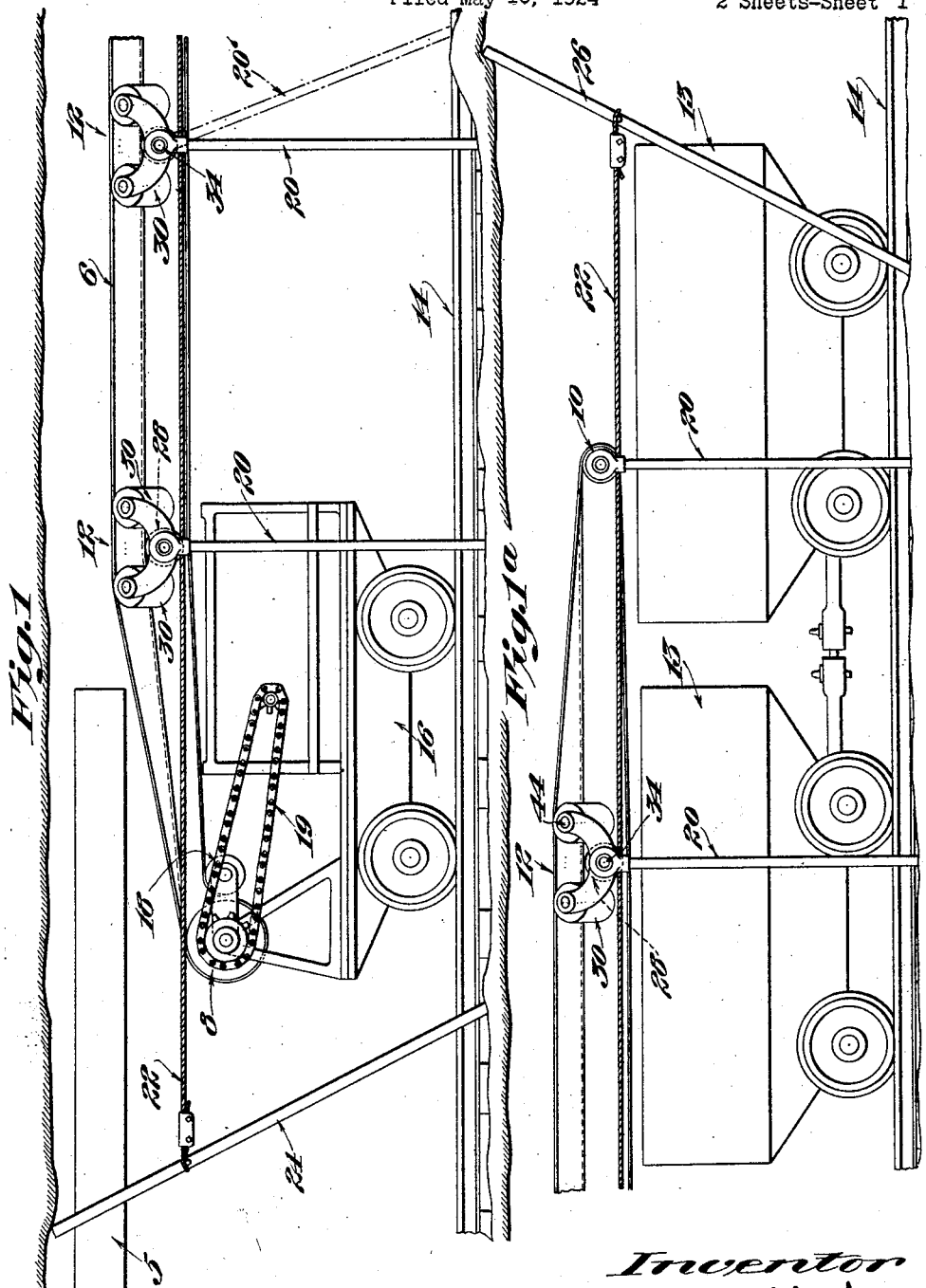
Inventor
Walter B. Clifford
by his attorneys
Van Everen, Fish, Hildreth & Carey

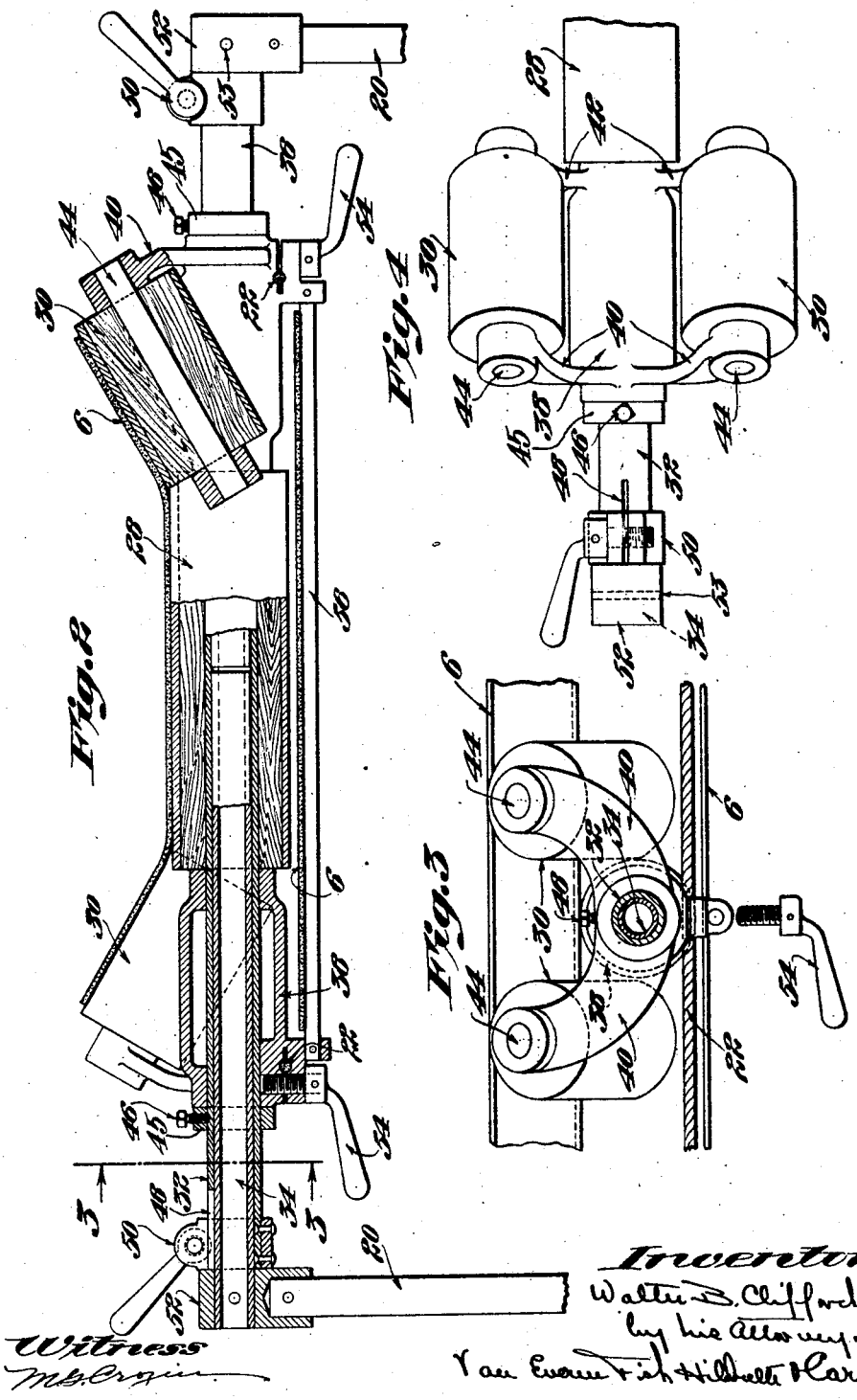

Patented Nov. 29, 1927.

1,651,253

UNITED STATES PATENT OFFICE.

WALTER B. CLIFFORD, OF FRAMINGHAM, MASSACHUSETTS, ASSIGNOR TO THE CLIFFORD CORPORATION, OF BOSTON, MASSACHUSETTS, A CORPORATION OF MASSACHUSETTS.

MATERIAL-HANDLING APPARATUS.

Application filed May 16, 1924. Serial No. 713,856.

The present invention relates to conveyors and more particularly to conveyors of a portable type which are adapted for the transfer of coal or ore under ground.

It will be evident to those skilled in the art that the loading of coal or ore into the usual mine or pit cars after it has been broken down from the vein is a relatively slow and tedious operation, due to the restricted working space and the difficulties attendant upon maintaining a constant supply of empty cars in loading position. Loading apparatus has been heretofore devised for picking up masses of broken down coal from the floor of a mining chamber and delivering this coal into pit cars. The efficiency of such apparatus, however, is seriously impaired by the difficulty of maintaining at all times an adequate supply of empty cars. This difficulty will be apparent when it is realized that the empty cars must be shunted into the working chamber over a single track and through a comparatively long and narrow passage. During the removal of filled cars and the replacement by empties, the loading apparatus is necessarily idle. It is not possible with the ordinary type of loading apparatus to practically handle more than one or two cars at most, as the necessary extension of the loading platform to handle more than one or two cars makes it impossible to handle the loading apparatus and transport it from one loading point to another under ground, due to the character of the passages and tunnels which are encountered.

It is the object of the present invention to provide a relatively simple and efficient form of conveying apparatus which may be employed either in conjunction with mechanical or hand loading and which permits the filling of a comparatively large number of cars at a single operation.

A further object of the invention is to provide a conveyor apparatus which may be readily erected and dismantled in any desired location and which is sufficiently strong and rigid to transport comparatively large masses of material.

With these and other objects in view, one feature of the present invention contemplates the provision of a series of supporting members or standards, a conveyor belt guided and supported by the standards or members, and a taut supporting cable to which the standards may be connected at the desired intervals.

A further feature of the invention contemplates the provision of a truck, an endless conveyor belt connected with the truck and driven therefrom, a series of supporting members for the belt, and means for rigidly retaining the members in any desired position to operatively support the belt.

Still further features of the invention consist in certain novel features of construction, combinations and arrangements of parts hereinafter described and claimed, the advantages of which will be obvious to those skilled in the art from the following description.

In the accompanying drawings illustrating the preferred form of the invention Fig. 1 is a side elevation of the loading end of the improved conveyor; Fig. 1ª is a side elevation of the discharge end of the conveyor shown in connection with a plurality of cars; Fig. 2 is a sectional detail illustrating the means for supporting the conveyor belt; Fig. 3 is an elevation in section of a portion of the support on line 3—3 of Fig. 2; and Fig. 4 is a plan view of the apparatus shown in Fig. 3.

According to the present invention, an endless conveyor belt is supported in a trough shaped section by a plurality of members each having a series of supporting rolls arranged to impart the desired transverse curvature to the belt. These supporting members comprise standards which engage with the ground or the bottom of the passage within which the conveyor is located and serve to support the belt intermediate its ends. The supporting members are not connected or secured to the ground or the walls of the passage but are caused to maintain their relative positions by connection with a taut supporting cable to which the members are connected. The cable may be conveniently maintained taut by bars connected to its opposite ends and wedged in place between the floor and roof of the passage, as clearly indicated in the drawings. After the bars and connecting cable have been properly erected, the supporting standards may be clamped to the cable in any desired position throughout its length. The driving end of the conveyor belt passes over a driving pulley mounted upon a truck and operated by any suitable form of motor. When the conveyor is dismantled the belt and standards may be placed upon the truck and transported from point to point. It will be apparent to those skilled in the art that although the present form of conveying apparatus is particularly adapted for operation in mine passages and tunnels where the conditions of operation are severe, nevertheless it is equally well adapted for operation above ground where it is desired to transport masses of material from one point to another by means of a portable conveying apparatus. It will be furthermore evident from the drawings that the present form of conveyor does not contemplate any permanent connection with the roof, walls or floor of the passageways and that the supporting members or standards project upwardly from opposite sides of the passage, leaving ample room in the central portion of the passage for movement of the cars to be loaded beneath the belt.

Referring to the drawings, the conveyor in its preferred form comprises an endless belt 6 passing over a driving pulley 8 at the loading end and a driven pulley 10 at the discharge end. The belt passes over intermediate supports indicated generally at 12, which guide the belt in a trough shaped section shown particularly in Fig. 2. The left hand end of the conveyor is loaded manually or by a suitable loading mechanism indicated conventionally at 5. The right hand end of the conveyor discharges over the idler pulley 10 into suitable cars 13, which are brought into the mine entry or room over track 14. The number of cars which may be loaded is only limited by the length of the conveyor system. The car at the extreme right hand end is first loaded and then the entire train is drawn to the right to bring the next car into position under the discharge end of the conveyor, and so on until all the cars are loaded. The driving pulley 8 is rotatably mounted upon a car 16, which is brought to the proper position adjacent the loading machinery and held motionless with respect to the tracks. The driving pulley 8 is rotated by a suitable motor through a driving chain indicated at 19. Tension is maintained upon the conveyor belt by a tightened pulley indicated at 18.

The belt guiding members 12 and the driven pulley 10 are mounted upon standards 20 which are adapted to rest on the floor of the mine adjacent the track. Each of the members is supported upon a pair of standards positioned at opposite sides of the track. The standards are not necessarily vertical but may be inclined to permit of assembly in places of restricted height or to maintain the belt horizontal in places where the floor is uneven. In Fig. 1, one of the standards is shown in dot and dash lines as slightly inclined at 20' to rest upon a small mound. The standards are fixed in position by means of a cable 22 securely attached to each of the standards in a manner to be presently explained. The cable is attached at its ends to inclined supports 24 and 26 which are wedged in position between the floor and roof of the mine, as shown. A similar cable is connected to suitable inclined supports on the other side of the track. When the cables are drawn taut the inclined supports are securely wedged in position and the standards 20 are maintained against motion even under the most severe conditions of operation.

The guiding mechanism, shown particularly in Fig. 2, comprises a central horizontal roller 28 and four inclined rollers 30, a pair of which are arranged at each end of the horizontal pulley 28 in a manner to impart a trough shaped section to the belt 6 and to permit handling of the ore without spilling over the sides. Each of the rollers is preferably constructed with a hard wood core and an external face of steel. The central pulley 28 is arranged for free rotation upon an external tubular shaft 32, into which telescopes a pair of internal tubular shafts 34 and 36, as indicated. Upon each side of the central pulley 28 is mounted a casting consisting of a tubular portion 38 attached to the shaft, a pair of external wing portions 40 and a pair of internal wing portions 42. In the internal and external wing portions are journalled shafts 44 to which the inclined rollers 30 are attached. The portion 38 of the casting is maintained in position on the external tubular shaft 32 by means of a collar 45 and set screw 46. By employing an outer shaft with a pair of internal telescoping shafts, the apparatus may be accommodated in tunnels of varying widths. The external shaft 32 is provided at its ends with slots 48, which allow the external shaft to be clamped over the internal shafts by means of suitable screw clamping mechanisms 50, thereby holding the assembly rigid. In order to support the apparatus, the standards 20 are provided with heads 52, which are rigidly attached to the internal shafts 34 and 36 by pins 53. It will be apparent to those skilled in the art that the telescoping action between the internal and external shafts not only allows a lateral adjustment of the apparatus but permits to a certain extent relative rotation between the shafts so that the standards 20 may be slightly inclined from the vertical in a manner which has been previously explained. The castings 38 are provided with circular openings to receive the cable 22. The openings are provided with slots which allow, by the use of suitable clamping screws 54, the clamping of the portions of the casting directly upon the cable in such a manner that the standards 20 with their guiding mechanisms 12 are maintained free from motion. The lower stretch of the belt passes over straight rods 56 pinned between the castings. Fig. 3 shows the belt guiding mechanism in sectional elevation with the clamping screw 54 dropped out in order to show the disposition of rod 56 with the belt 6 passing over it. The driven pulley 10 is maintained upon suitable telescoping shafts in a manner which will be obvious to those skilled in the art upon consideration of the fact that the belt assumes a normal shape in passing over the driven pulley.

It will be apparent that the present invention provides an overhead conveyor system of broadly new and useful character to facilitate the removal of coal and ore from mines. The system is assembled by passing the cable 22 through the proper openings in the castings 38 and setting up the standards in convenient positions intermediate to the ends of the conveyor. The inclined supports are then wedged in position and the cable is drawn taut in an obvious manner, after which the clamping screws 54 are manipulated to hold the entire assembly rigid. After working, if it becomes necessary to move the loading machinery slightly to the left, it is possible to move the conveyor slightly without dismantling the entire apparatus. It is only necessary to loosen the clampng screws 54 and move the standards along the cable, at the same time moving the car 16. When it is necessary to move the entire apparatus over considerable distances the conveyor may be quickly dismantled by loosening the cable 22 and packing the entire apparatus upon the car 16. It will be apparent that the extreme flexibility of the improved conveyor is due in part to the fact that no permanent connections with the tunnel or entry are contemplated.

I claim:

1. A portable conveyor comprising a series of separate belt-supporting units adapted to rest upon a rigid supporting surface, an endless belt supported by the units, a flexible member extending lengthwise of the belt, connections between the upper portion of each of the units and the flexible member for clamping the units to the member, and means at opposite ends of the flexible connection for maintaining the latter in a taut condition to maintain the units rigidly in a variable spaced and belt-supporting relation.

2. A portable conveyor comprising a carriage, belt-driving mechanism mounted on the carriage, an endless belt connected with the mechanism, a plurality of belt-supporting units each adapted to rest upon a rigid supporting surface, an independent flexible member extending lengthwise of the belt, clamping connections between the upper portion of each of the units and the flexible member, and independent means at opposite ends of the flexible member for maintaining the latter taut to hold the units rigidly in spaced and belt-supporting position.

3. A portable conveyor comprising an endless belt, a plurality of supporting units for the belt, each having a series of belt-supporting rolls and spaced supporting standards, a flexible member extending lengthwise of the belt and detachably clamped to each of the units, and means positioned at opposite ends of the flexible member for holding it taut to maintain the standards in a predetermined belt-supporting position.

4. A conveyor comprising an endless belt, a plurality of belt-supporting units each having two sets of oppositely-disposed, inclined and spaced rolls adapted to engage the margins of the belt, and an intermediate roll positioned between the two rolls of each inclined set to support the bottom of the belt, and means for maintaining the belt-supporting units in spaced relation.

5. A conveyor comprising an endless belt, a plurality of belt-supporting units each having two sets of oppositely-disposed, inclined and spaced rolls adapted to engage the margins of the belt, an intermediate roll extending at its ends partially into the space separating the two inclined rolls of each set adapted to support the bottom of the belt, and means for maintaining the belt-supporting units in spaced relation.

6. Material handling apparatus comprising an endless conveyor, a series of rolls for supporting the working portion of the conveyor in a trough shaped section, supporting standards positioned at opposite sides of the conveyor for supporting the roll series, and means for adjusting the separation and relative inclination of the standards with respect to one another.

7. Material handling apparatus comprising an endless conveyor belt, a series of inclined rolls for supporting the working portion of the belt in a trough shaped section, a head upon which the rolls are rotatably mounted, standards positioned at opposite sides of the head, and a shaft connected to each of the standards and telescoping within the head to permit a separation and relative rotation of the standards with respect to one another.

8. A conveyor comprising an endless belt, a plurality of belt-supporting units each having a series of belt-supporting rolls and oppositely-disposed, spaced supporting standards, means for adjustisg the standards toward and from one another without altering the relative positions of the supporting rolls, and means for maintaining the units in spaced relation.

9. The combination of a portable conveyor having an endless belt with a belt-supporting unit comprising a series of supporting rolls adapted to engage the bottom and marginal portions of the belt to maintain a trough-shaped section, oppositely-disposed spaced standards, and connections for supporting the rolls from the standards having provision for adjustment of the rolls toward and from one another and for independent adjustment of the standards toward and from one another.

10. The combination in a portable conveyor having an endless belt, a belt-supporting unit comprising spaced supporting standards, a shaft connecting the standards and comprising telescoping parts, roll-supporting brackets mounted upon the shaft, each having two inclined rolls carried thereby, an intermediate roll journaled upon the shaft between the two sets of inclined rolls, and means for varying the effective length of the shaft.

WALTER B. CLIFFORD.